(12) United States Patent
Kufner et al.

(10) Patent No.: US 10,017,062 B2
(45) Date of Patent: Jul. 10, 2018

(54) ELECTRIC CHARGING DEVICE, ELECTRIC CONNECTION DEVICE, SYSTEM AND METHOD FOR CHARGING A BATTERY OF A VEHICLE

(71) Applicant: Robert Bosch GmbH, Stuttgart (DE)

(72) Inventors: Annika Carolin Kufner, Neunkirchen am Brand (DE); Ahmet Kilic, Boeblingen (DE); Falco Sengebusch, Singapore (SG)

(73) Assignee: Robert Bosch GmbH, Stuttgart (DE)

(*) Notice: Subject to any disclaimer, the term of this patent is extended or adjusted under 35 U.S.C. 154(b) by 137 days.

(21) Appl. No.: 15/110,282

(22) PCT Filed: Nov. 17, 2014

(86) PCT No.: PCT/EP2014/074735
§ 371 (c)(1),
(2) Date: Jul. 7, 2016

(87) PCT Pub. No.: WO2015/104080
PCT Pub. Date: Jul. 16, 2015

(65) Prior Publication Data
US 2016/0332525 A1 Nov. 17, 2016

(30) Foreign Application Priority Data

Jan. 10, 2014 (DE) .......................... 10 2014 200 290

(51) Int. Cl.
*H01R 33/00* (2006.01)
*B60L 11/18* (2006.01)
*H01R 13/631* (2006.01)

(52) U.S. Cl.
CPC ....... *B60L 11/1818* (2013.01); *B60L 11/1824* (2013.01); *B60L 11/1827* (2013.01);
(Continued)

(58) Field of Classification Search
CPC ..... Y02T 90/14; Y02T 90/125; Y02T 90/121; Y02T 10/7088; Y02T 10/7005;
(Continued)

(56) References Cited

U.S. PATENT DOCUMENTS

| 5,306,999 | A | | 4/1994 | Hoffman | |
|---|---|---|---|---|---|
| 5,495,159 | A | * | 2/1996 | Shiraishi | B60L 11/1816 191/22 C |
| 5,504,991 | A | * | 4/1996 | Parmley, Sr. | B60L 11/1822 29/747 |
| 6,831,221 | B2 | * | 12/2004 | Hulen | B60L 5/005 136/205 |

(Continued)

FOREIGN PATENT DOCUMENTS

| CN | 102152746 A | 8/2011 |
|---|---|---|
| CN | 103419674 A | 12/2013 |

(Continued)

OTHER PUBLICATIONS

International Search Report for Application No. PCT/EP2014/074735 dated Jan. 28, 2015 (English Translation, 3 pages).

*Primary Examiner* — Abdullah Riyami
*Assistant Examiner* — Nelson R Burgos-Guntin
(74) *Attorney, Agent, or Firm* — Michael Best & Friedrich LLP

(57) ABSTRACT

The invention relates to an electric charging device, to a charging system, to a method for charging a battery of a vehicle, and to an electric connection device of a vehicle for charging a battery of the vehicle. The electric charging device comprises the following: a lifting device (11) to which a charging head (12) is coupled, wherein the charging head (12) has a first plurality of first electric contacts (14) on a first surface (13) of the charging head (12), at least some of said contacts being connectable to an energy source in order to charge the battery; and an actuator (16) by means of which the lifting device (11) can be actuated such that the charging head (12) can be at least partly moved in a first direction (R1) that is substantially perpendicular to the first surface (13). The lifting device (11) is further designed such that the charging head (12) can be moved in a second (Continued)

direction (R2) along a stop surface (U, P) by continuing to actuate the lifting device (11) by means of the actuator (16) upon striking the stop surface (U, P) in the first direction (R1).

11 Claims, 9 Drawing Sheets

(52) U.S. Cl.
CPC ...... *B60L 11/1833* (2013.01); *H01R 13/6315* (2013.01); *B60L 2230/12* (2013.01); *H01R 2201/26* (2013.01); *Y02T 10/7005* (2013.01); *Y02T 10/7088* (2013.01); *Y02T 90/121* (2013.01); *Y02T 90/125* (2013.01); *Y02T 90/14* (2013.01)

(58) Field of Classification Search
CPC ............. H01R 2201/26; B60L 11/1833; B60L 11/1827; B60L 11/1824; B60L 11/1818
USPC ........................ 439/345, 310, 259; 310/109
See application file for complete search history.

(56) References Cited

U.S. PATENT DOCUMENTS

| | | | |
|---|---|---|---|
| 7,999,506 B1 | 8/2011 | Hollar et al. | |
| 9,056,555 B1* | 6/2015 | Zhou | B60L 11/1827 |
| 9,764,653 B2* | 9/2017 | Sarkar | B60L 11/1833 |
| 9,770,993 B2* | 9/2017 | Zhao | B60L 11/1846 |
| 9,815,377 B2* | 11/2017 | Wu | B60L 11/1818 |
| 9,868,421 B2* | 1/2018 | Hassounah | B60S 5/06 |
| 2009/0011616 A1* | 1/2009 | Patwardhan | H01R 13/629 |
| | | | 439/34 |
| 2011/0066515 A1 | 3/2011 | Horvath et al. | |
| 2011/0181241 A1 | 7/2011 | Badger | |
| 2012/0299425 A1* | 11/2012 | Tsai | F01K 13/00 |
| | | | 310/113 |
| 2013/0076902 A1* | 3/2013 | Gao | B25J 9/042 |
| | | | 348/148 |
| 2016/0006147 A1* | 1/2016 | Loo | B60K 1/04 |
| | | | 439/500 |

FOREIGN PATENT DOCUMENTS

| | | |
|---|---|---|
| DE | 102009006982 A1 | 8/2009 |
| FR | 2688350 | 9/1993 |

\* cited by examiner

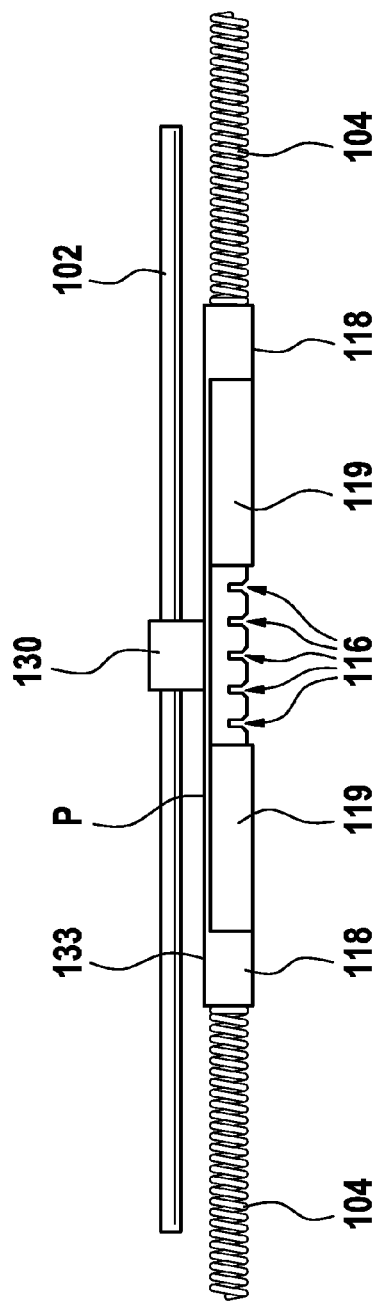

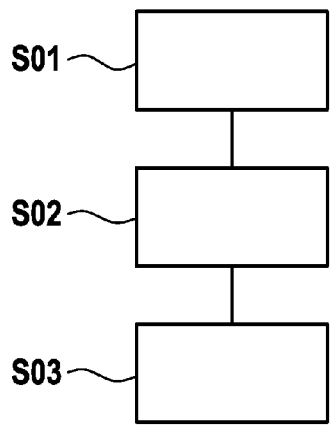
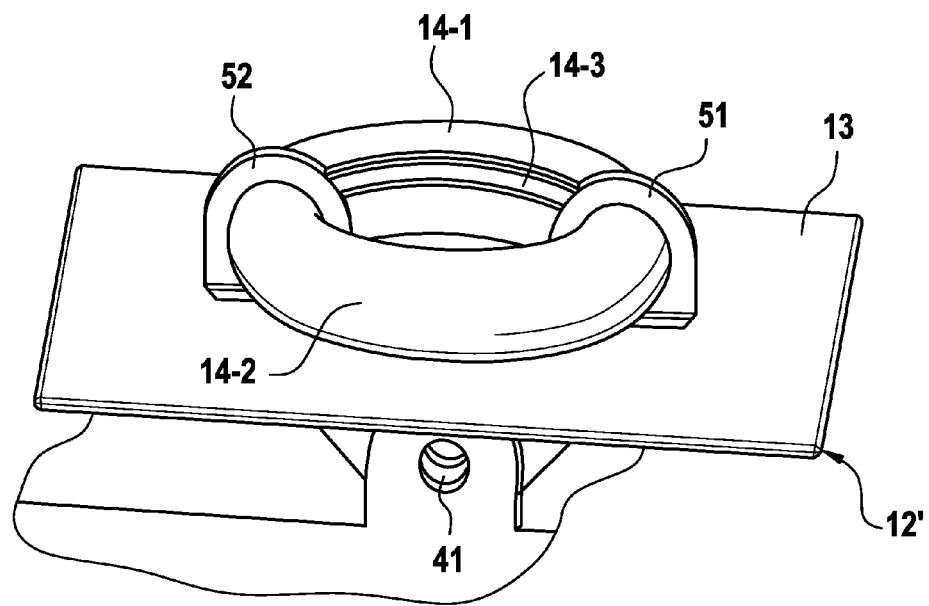

ELECTRIC CHARGING DEVICE, ELECTRIC CONNECTION DEVICE, SYSTEM AND METHOD FOR CHARGING A BATTERY OF A VEHICLE

BACKGROUND OF THE INVENTION

The present invention relates to an electric charging device for charging a battery of a vehicle, to an electric connection device of a vehicle for charging a battery of the vehicle, to a system for charging a battery of a vehicle and to a method for charging a battery of a vehicle.

Hybrid and electric vehicles at least partially resort to batteries in order to supply their drive train with energy. If the battery of a vehicle is empty, it can be recharged at a charging station by means of a charging device.

The positioning of the vehicle with respect to the charging device as automatically as possible and the connection of the charging device to the vehicle as automatically as possible for the purpose of charging the battery comprise some technical challenges. Automated conductive charging systems require precise guidance of a charging head, for example a connector, of the charging device to a receiving head, for example a connector socket, of a connection device on a vehicle.

On account of their different designs, vehicles often have different positions for the receiving head. In addition, no uniformity is ensured as a result of a receiving head being arranged on the underbody of the vehicle since vehicles have different heights and the underbody of vehicles is therefore at a different height from a base on which the vehicle stands. Vehicles are usually positioned precisely and sometimes also obliquely by their drivers, only apart from an error of approximately +−10 cm. The task of guiding the charging head to the receiving head can be handled, for example, by technically complex robots, for instance having target acquisition, measuring and image processing systems.

U.S. Pat. No. 2,011,066 515 A1 describes an automatic connector station for charging electric and hybrid vehicles. In this case, the vehicle is positioned over a trapdoor. A positioning system detects the position of a connector socket on the vehicle. A connector can be vertically extended and retracted for the purpose of being plugged into and unplugged from the connector socket and is connected to an energy source. On the basis of the detected position of the connector socket on the vehicle, the connector is horizontally displaceable in two dimensions, with the result that the connector enters the connector socket when vertically extended.

SUMMARY OF THE INVENTION

The present invention discloses a charging device, a connection device, a charging system and a method for charging a battery of a vehicle.

Accordingly, an electric charging device for charging a battery of a vehicle is provided, having: a lifting device, to which a charging head is coupled; the charging head having a first plurality of first electric contacts at or on a first surface of the charging head, at least some of which contacts can be connected to an energy source for the purpose of charging the battery; and an actuator which can be used to actuate the lifting device in such a manner that the charging head can be moved at least partially in a first direction which is substantially perpendicular to the first surface; the lifting device also being designed in such a manner that, upon striking a stop surface in the first direction, the charging head can be moved in a second direction along the stop surface by means of continued actuation of the lifting device by the actuator.

An electric connection device of a vehicle for charging a battery of the vehicle is also provided, having: a receiving head which has a second plurality of second electric contacts at or on a second surface of the connection device; a guide device for receiving a charging head which is placed against the connection device and moves substantially parallel to the second surface and for guiding the moving charging head and the receiving head into a predetermined positional relationship with respect to one another; in which case, if the charging head and the receiving head are substantially in the predetermined positional relationship with respect to one another, the battery of the vehicle can be charged via the second electric contacts.

A charging system for charging a battery of a vehicle is also provided, having:

an electric charging device according to the invention which is installed outside the vehicle; and an electric connection device according to the invention which is formed on the vehicle; the charging head of the charging device being designed in such a manner that it can be inserted into the guide device of the connection device, and the first electric contacts being able to be at least partially placed against the second electric contacts for the purpose of charging the battery.

A method for charging a battery of a vehicle is also provided, comprising:

actuating a lifting device by means of an actuator in such a manner that a charging head connected to the lifting device moves at least partially in a first direction which is substantially perpendicular to a first surface of the charging head, a first plurality of first electric contacts being formed at the first surface, which contacts are at least partially connected to an energy source; and also in such a manner that, if the charging head strikes a stop surface in the first direction, the charging head moves in a second direction along the stop surface; guiding the charging head moving along the stop surface into a predefined charging position with respect to a receiving head having second electric contacts by means of a guide device; and charging the battery of the vehicle from the energy source via the first and second electric contacts.

The knowledge on which the present invention is based is that a system for charging a battery of a vehicle can be provided with technically little effort, which system can be actuated using an actuator, in particular using precisely a single actuator, in such a manner that, in the case of a position of the vehicle inside a predetermined area around a charging device, a charging head of the charging device is automatically guided to a receiving head on the vehicle. The vehicle can be guided into the predetermined area by means of a navigation or parking assistance system, for example.

The actuator of the charging device according to the invention causes the charging head fastened to the lifting device to first of all be raised to the underbody of the vehicle and to then be automatically moved along the underbody in a manner pressed against the latter. The height of the underbody of the vehicle must neither be known nor must assume a particular value. Rather, the charging device can be flexibly used in a multiplicity of vehicles without any adaptation. It may suffice if the height of the underbody assumes values in a particular range of values.

An individual actuator advantageously causes a linear movement of a part of the lifting device, in particular a slide, which in turn causes the remaining movement of the charging device, as described above. As a result, the charging device is technically particularly simple, robust and reliable.

Charging on the underside of the vehicle has the advantage that disruptive interaction with the charging system or with the charging device is made difficult. Furthermore, the design freedom of the vehicle manufacturers is not restricted by this solution.

According to the invention, a connection device is formed on the vehicle in such a manner that the moving charging head which strikes it is guided even in the case of a certain lateral offset with respect to the predetermined charging position of the charging head with respect to the receiving head. This is carried out in a purely mechanical manner without electronic elements on the connection device side. Only the single actuator is preferably still used on the charging device side.

Advantageous embodiments and developments emerge from the subclaims and from the description with reference to the figures.

According to one preferred development of the electric charging device, the first electric contacts are in the form of lamellae which are parallel to one another and are perpendicular to the first surface. As a result, the first contacts can be contact-connected to corresponding contacts of a connection device in a particularly stable manner.

According to another preferred development, at least one of the lamellae has a different length in comparison with the remaining lamellae. The contact-connection can be carried out by inserting the lamellae into guide slots having contacts along the lamellae. As a result of the different length of the at least one lamella, this first contact can be contact-connected earlier, later, for a longer or shorter time than the contact-connection of the remaining first contacts.

According to another preferred development, at least one of the lamellae is arranged in a manner offset from the remaining lamellae in a direction along the lamellae. As a result of the different length of the at least one lamella, this first contact can be contact-connected earlier or later than the contact-connection of the remaining first contacts.

According to another preferred development, the charging head is coupled to the lifting device via a first arm; a first end of the first arm being coupled to the charging head via a first spring; and a second end of the first arm being coupled to the remaining lifting device via a second spring. As a result, the charging head can be pressed against the stop surface of the vehicle by means of a restoring force and, at the same time, can be moved along the stop surface. At the same time, the situation is avoided in which the charging head can be pressed too strongly against the stop surface or cannot be lifted up to the stop surface on account of its weight.

According to another preferred development, the actuator and the lifting device are formed in such a manner that the lifting device can be actuated for the purpose of moving the charging head by virtue of the actuator causing a linear movement of a slide of the lifting device. Linear movements are particularly simple and easy to control. The technical elements required for this purpose are simple, technically not very complicated, robust and reliable.

According to one preferred development of the connection device according to the invention, the second electric contacts are arranged parallel to one another and at a distance from one another in a direction parallel to the second surface. As a result, charging heads having first contacts arranged parallel to one another can be used to contact-connect the connection device.

According to another preferred development, the receiving head is movable with respect to the vehicle and is connected to the vehicle via at least one spring. The at least one spring can exert a restoring force in the event of deflections of the receiving head from a position of rest. As a result, the connection device can be automatically displaced in such a manner that the charging head and the receiving head can be brought into the predefined positional relationship with respect to one another, that is to say the first and second contacts can make contact with one another.

The above configurations and developments can be combined with one another in any desired manner if useful. Further possible configurations, developments and implementations of the invention also comprise combinations (not explicitly mentioned) of features of the invention described above or below with respect to the exemplary embodiments. In particular, a person skilled in the art will also add individual aspects to the respective basic form of the present invention as improvements or additions.

BRIEF DESCRIPTION OF THE DRAWINGS

The present invention is explained in more detail below using the exemplary embodiments which are illustrated in the schematic figures of the drawings, in which:

FIG. 4C shows a schematic plan view from the front of an electric connection device of a vehicle for charging a battery of the vehicle according to the first embodiment of the second aspect of the present invention;

FIG. 6 shows a schematic flowchart of a method according to the invention according to a third aspect of the present invention;

FIG. 7 shows an electric charging device of a vehicle for charging a battery of the vehicle according to a second embodiment of the first aspect of the present invention.

In all figures, identical or functionally identical elements and devices are provided with the same reference symbols, unless stated otherwise.

DETAILED DESCRIPTION

Figure 1A:
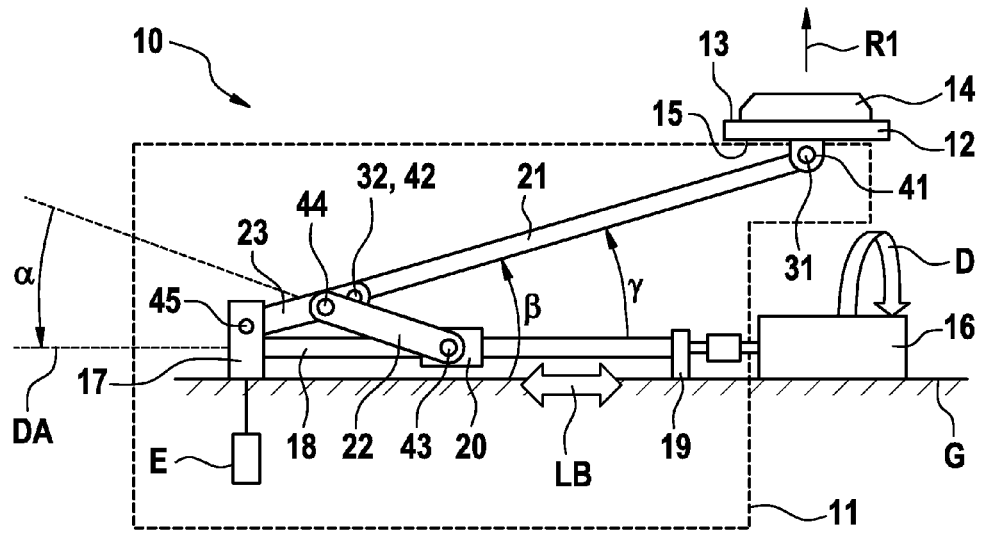
FIG. 1A shows a schematic side view of an electric charging device for charging a battery of a vehicle according to a first embodiment of a first aspect of the present invention in a first state.

FIG. 1A shows a schematic side view of an electric charging device 10 for charging a battery of a vehicle according to a first embodiment of a first aspect of the present invention in a first state.

A charging head 12 has a first plurality of electric contacts 14 at a first surface 13 of the charging head 12. The electric contacts 14 are in the form of lamellae which are parallel to one another and are perpendicular to the first surface 13. When seen from the side, the lamellae are trapezoidal strips, the longer of the two parallel sides of the trapeze respectively being connected to the first surface 13. The charging device 10 is set up on a base G, for example the ground, a floor, a vehicle floor or another suitable flat surface. It is advantageous to fit the charging device 10 on a surface which is lower than the ground and is parallel to the latter or in a recess, for instance in the ground of a parking lot. If the charging device 10 is formed in a compartment or a hollow in a bump, which is also advantageous, the charging device 10 can be protected from rainwater, for example, when puddles form. The first surface 13 is substantially parallel to the base G and points away from the latter. If set up on the ground, the first surface 13 therefore points upward.

The charging head 12 is coupled to a lifting device 11 which can be actuated by means of an actuator 16 in order to move the charging head 12. The charging head 12 is rotatably coupled, via a first arm 21 as part of the lifting device 11, to the rest of the lifting device 11. The charging head 12 is coupled to a first end of the first arm 21 via a first rotating joint 41 having a first torsion spring 31 in such a manner that the axis of the first torsion spring 31 is parallel to the first surface 13. The first rotating joint 41 is formed on a side surface 15 of the charging head 12 which faces away from the first surface 13. The charging head 12 can be tilted about the axis of the first torsion spring in a first angular range by means of the first torsion spring 31, the first surface 13 being parallel to the base G in the position of rest. The first angular range is between −90° and +90°, advantageously between −45° and +45°, in particular between −30° and +30°. The first arm 21 is rotatably coupled, at a second end of the first arm 21, to the rest of the lifting device 11 by means of a second torsion spring 32 on a second joint 42. The axis of rotation of the second rotating joint 42 is parallel to the axis of rotation of the first rotating joint 41.

According to the first embodiment, the actuator 16 is in the form of an electric motor for rotating a shaft W. The shaft W is coherently connected to a guide 18 of the lifting device 11 which is in the form of a thin full or hollow cylinder, sometimes with a screw thread on the outer casing. A slide 20 of the lifting device 11 is mounted on the guide 18 by means of an inner screw thread which engages in the screw thread of the guide 18.

Two second arms 22 of the lifting device 11 are rotatably mounted, at respective first ends of the second arms 22, on the slide 20 via two third rotating joints 43. The axes of rotation of the third rotating joints 43 are collinear and parallel to the axes of rotation of the first and second rotating joints 41, 42. At respective second ends of the second arms 22, the second arms 22 are rotatably coupled to a third arm 23 of the lifting device 11 via at least one fourth rotating joint 44. The third arm 23 is rotatably coupled, at a first end of the third arm 23, to the first arm 21 via the second rotating joint 42 having the second torsion spring 32. The fourth rotating joint 44 is arranged on the third arm 23 between the first end of the third arm 23 and a second end of the third arm. The fourth rotating joint 44 is preferably closer to the first end of the third arm 23 than to the center point between the first and second ends of the third arm 23 and also closer to the first end than to the second end of the third arm 23. The axis of rotation of the fourth rotating joint 44 is parallel to the axes of rotation of the first, second and third rotating joints 41, 42, 43.

The third arm 23 is rotatably coupled, at the second end of the third arm 23, to a first bearing block 17 of the lifting device 11 via a fifth rotating joint 45. The guide 18 is rotatably mounted, at a first end of the guide 18, in the first bearing block 17, the guide not having a screw thread on the mounted section of its outer casing. The bearing block 17 is permanently connected to the base G. The axis of rotation of the fifth rotating joint 45 is parallel to the axes of rotation of the first, second, third and fourth rotating joints 41, 42, 43, 44. The axis of rotation DA of the guide 18—and therefore simultaneously of the shaft W—is in a conceivable plane which is perpendicular to the axes of rotation of all rotating joints 41, 42, 43, 44, 45.

As a result of the slide 20 being connected via the third joint 43, the second arm 22, the fourth joint 44, the third arm 23, the fifth joint 45 and the bearing block 17, the slide 20 cannot be rotated around the guide 18 at its screw thread, even during rotation D of the shaft W and the guide 18 by the actuator 16, but rather instead carries out a linear movement LB during the rotation D. The linear movement LB can take place between the first bearing block 17 and a second bearing block 19. The slide 20 can move away from the first bearing block 17 at most to an extent allowed by the combined length of the second and third arms 22, 23. The guide 18 is rotatably mounted, at a second end of the guide 18, on the second bearing block 19 and is connected to the shaft W.

The first electric contacts 14 are at least partially connected to an energy source E via at least one cable. At least one of the first electric contacts 14 can also be connected to a first control device of the charging device 10 via a further cable. This first contact 14 can therefore be used to transmit control and/or data signals to the vehicle to be charged. One or more of the cables can run in the interior of the first arm 21 in the form of a hollow profile and in the interior of the third arm 23 in the form of a hollow profile and can be connected to the energy source arranged under the base G via the interior of the bearing block 17. One or more cables can also be routed along the arms 21 and/or 23 on the outside. In this case, the cable can advantageously be fixed only at two points on the arms 21, 23, with the result that it is loose enough to allow bending and/or stretching movements of the arms relative to one another. The energy source E can simultaneously provide the energy for the actuator 16, here an electric torque motor.

FIG. 1A shows a state in which the slide 20 has been linearly moved from the second bearing block 19 in the direction of the first bearing block 17 by the rotation D of the shaft W as actuation of the lifting device 11. The closer the slide 20 approaches the first bearing block 17, the more the second arm 22 lifts from a position parallel to the guide 18. That is to say, an angle α between the second arm 22 as the first limb and the axis of rotation DA of the guide 18 as the second limb with the third rotating joints 43 as the apex increases from substantially 0° for a maximum distance between the slide 20 and the first bearing block 17 to a maximum value of the angle α for a minimum distance between the slide 20 and the first bearing block 17. The third arm 23 is also raised as a result. An angle β between the base G as the first limb and the third arm 23 as the second limb and/or an angle γ between the guide 18 as the first limb and the third arm 23 as the second limb may also increase from 0°, for example, to more than 90° in this case.

Since the third arm 23 is coupled to the first arm 21 via the second torsion spring 32, the first arm 21 is also moved with the charging head 12 as a result of the rotation D. The spring hardness of the second torsion spring 32 is set in this case with respect to the weight of the first arm 21 and of the charging head 12 in such a manner that the first arm 21 initially lifts with the third arm 23 substantially like an extension of the third arm. The first arm 21 is longer than the second arm 23, for example three times as long. The charging head 12 at the first end of the first arm 21 therefore initially moves, as a result of the rotation D, on a circular path with a small deflection with respect to the base, that is to say partially, preferably mainly in a first direction R1 which is perpendicular to the first surface 13. If the base G is the ground, the charging head 12 therefore moves mainly upward.

Figure 1B:
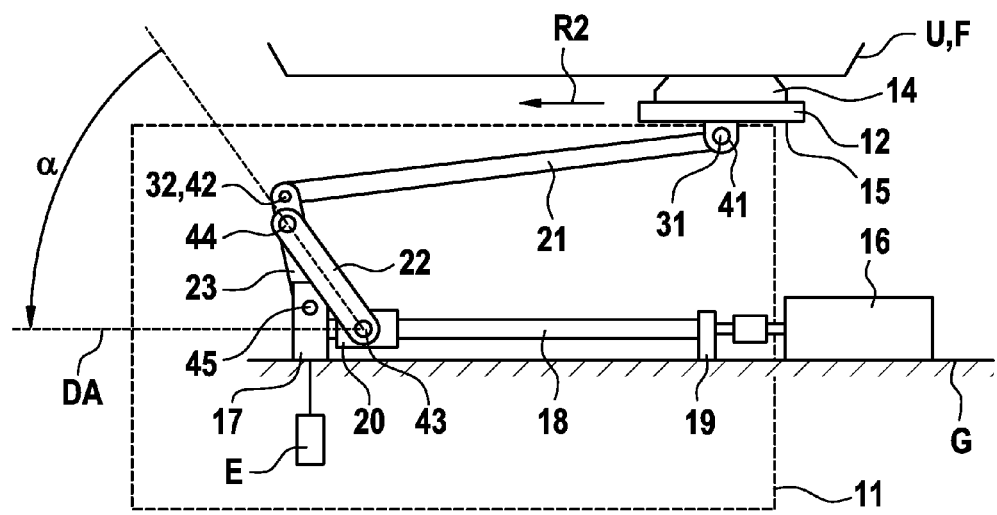
FIG. 1B shows a schematic side view of an electric charging device for charging a battery of a vehicle according to the first embodiment of the first aspect of the present invention in a second state.

FIG. 1B shows a schematic side view of an electric charging device 10 for charging a battery of a vehicle according to the first aspect of the present invention in a second state.

When the charging device 10 is used according to the invention, a vehicle F with an underbody U is positioned at an initially unknown height above the charging device 10. If the charging head 12 strikes the underbody U as the stop surface during its movement, as described with reference to FIG. 1A, the movement is inhibited in the first direction R1. On account of the further movement of the third arm 23, the charging head 12 is then moved, in a manner pressed against the underbody U, along a second direction R2 which is arranged substantially parallel to the first surface 13 and perpendicular to the first direction R1.

Figure 2:
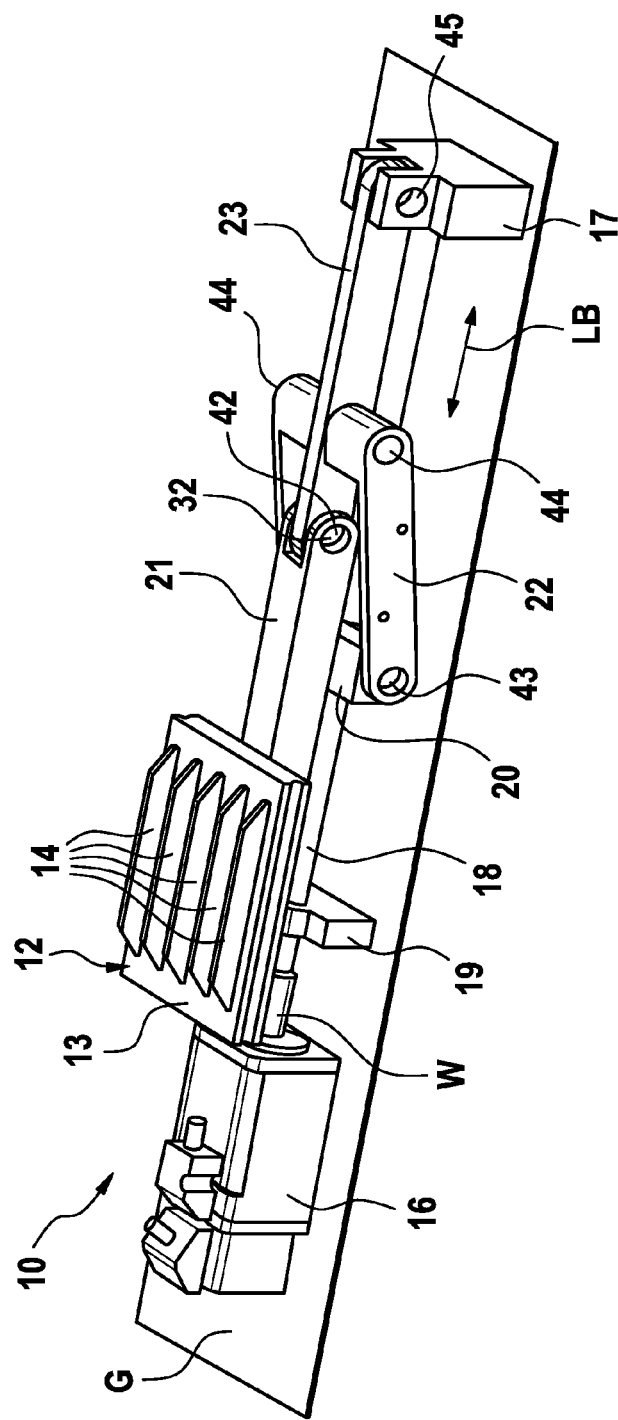
FIG. 2 shows an oblique plan view of the charging device according to the first embodiment of the first aspect of the present invention.

FIG. 2 shows an oblique plan view of the charging device 10 according to the first aspect of the present invention.

Figure 3:
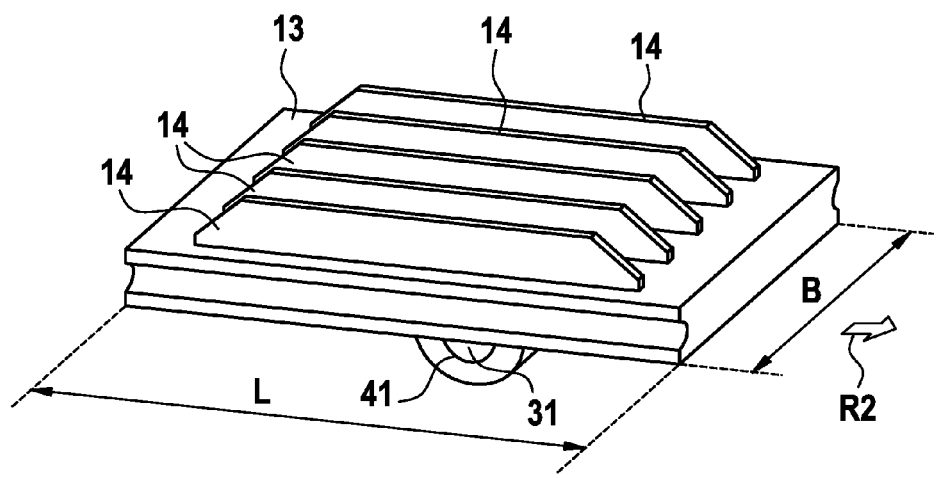
FIG. 3 shows a detailed view of the charging head of the charging device according to the first embodiment of the first aspect of the present invention.

FIG. 3 shows a detailed view of the charging head 12 of the charging device 10 according to the first aspect of the present invention.

A first plurality of first electric contacts 14 are formed at the first surface 13 of the charging head 12 having the width B and the length L. The first contacts 14 are in the form of lamellae which are arranged parallel to one another and parallel to the length L of the charging head 12 and are perpendicular to the first surface 13. According to the invention, the charging head 12 is guided to a connection device 110 along the second direction R2 parallel to the lamellae and parallel to the length L.

Some or all of the lamellae of the first contacts 14 may have different lengths. Some or all of the lamellae may also be arranged in a manner offset from one another along the second direction R2. This may result in temporally offset contact-connection and/or contact-disconnection of the different first electric contacts 14 when the charging head 12 is being guided to the connection device 110. For example, an electric first contact 14 which is connected to a first control device of the charging device 10 can first of all be contact-connected to a second electric contact of the connection device 110 which is connected to a second control device of the connection device 110. If an abort signal is output from one of the control devices in this case, for example, the actuator 16, for instance, can be controlled by the first control device to reverse the direction of rotation D.

The charging device can be flexibly designed to charge with direct current or alternating current. Information relating to whether charging is intended to be carried out using direct current or alternating current or another type of current can be transmitted, for instance, during the first contact-connection of a first contact 14 in terms of time.

According to FIG. 3, five first contacts 14 are formed on the charging head 12, that is to say the first plurality is five. Alternatively, however, the first plurality may also be seven or more, for example. In this case, five and seven contacts may comply with current standards for single-phase and three-phase charging with direct current. The plurality may also be an even number and may be four or six, for example. One or more of the first contacts 14 may be in the form of a ground line, a high-voltage line, a low-voltage line etc. for the purpose of transmitting data and/or control signals.

Figure 4A:
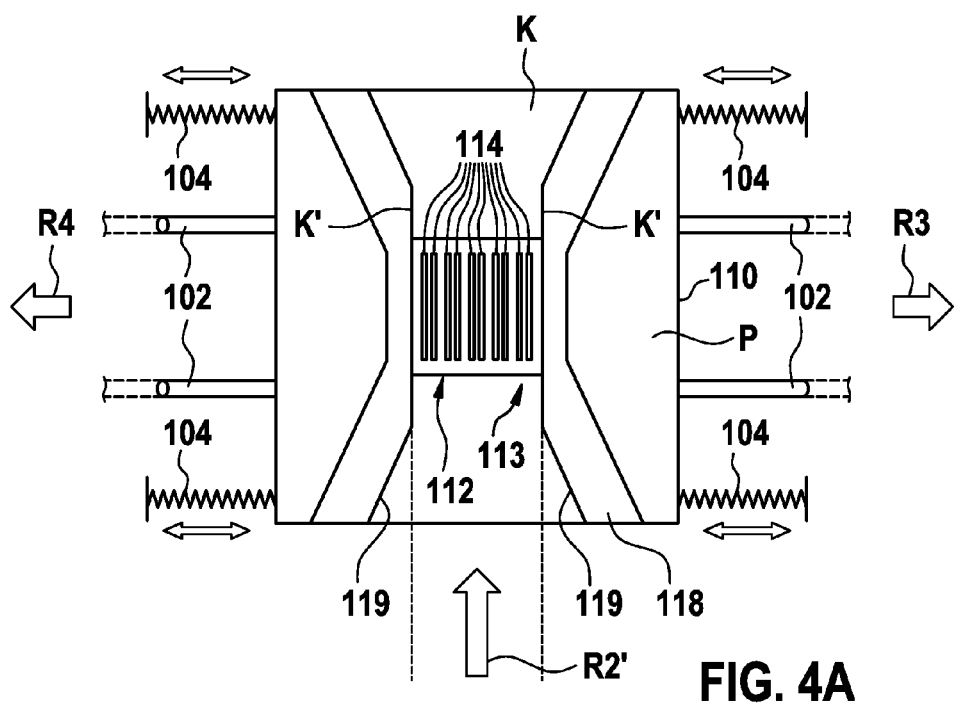
FIG. 4A shows a schematic plan view from below of an electric connection device of a vehicle for charging a battery of the vehicle according to a first embodiment of a second aspect of the present invention.

FIG. 4A shows a schematic plan view from below of an electric connection device 110 of a vehicle for charging a battery of the vehicle according to a first embodiment of the second aspect of the present invention. The connection device 110 according to the first embodiment of the second aspect and the charging device 10 according to the first embodiment of the first aspect may together constitute an embodiment of the charging system according to the invention.

The connection device 110 is arranged on the underbody U of the vehicle. A plate P of the connection device 110 is mounted on or around two rods 102 arranged parallel to one another in such a manner that it is displaceable along the rods 102. The connection device 110 is connected to the rest of the vehicle via the rods 102. The rods 102 may be hollow on the inside. Cables can run inside the rods 102 between the vehicle, in particular a battery of the vehicle, and the connection device and can electrically couple them to one another. The displaceability of the plate P on the rods 102 is reduced by at least one spring 104 arranged parallel to the rods 102. According to FIG. 4, four springs 104 exert a restoring force in such a manner that the plate P is in the center of the rods 102 and, at the same time, is on the longitudinal axis of the vehicle in the position of rest. Restoring force is used to mean a spring force which counteracts a deflection of the plate P and therefore also of the receiving head 102 from their respective position of rest.

According to the described embodiment of the second aspect, a receiving head 112 is formed on the plate P of the connection device 110 and has a second plurality of second electric contacts 114 on a second surface 113 of the plate P. The second electric contacts 114 are at least partially electrically connected to the battery of the vehicle via the cables inside the rods 102. One or more second contacts 114 may also be connected to a control device of the vehicle which can be used to control the charging of the battery.

The second surface 113 faces away from the vehicle. The receiving head 112 is surrounded by a guide device 118 on the second surface 113 of the plate P, which guide device is used to guide a charging head 12 of a charging device 10 according to the invention into a predetermined charging position with respect to the receiving head 112. According to the embodiment of the second aspect of the present invention, as described with reference to FIG. 5, the guide device 118 can be described as "symmetrically hourglass-shaped in three stages" in plan view, the receiving head 112 being at the narrowest point in the center of the hourglass. The guide device 118 therefore forms a channel K which tapers in a V-shaped or funnel-shaped manner in the direction of the receiving head 112 at both ends of the channel until the width of the channel K substantially corresponds to the width of the receiving head 112. The width of the receiving head 112 is substantially equal to the width B of the charging head 12 according to the invention, with the result that the charging head 12 of the charging device 10 according to the invention can run completely through the channel K. The receiving head 112 is formed in a section K' of the channel K with a constant width.

The charging head 12 of the charging device 10 will usually not move toward the receiving head 112 exactly in a desired direction R2' if it moves along the second direction R2 in a manner pressed against the underbody of the vehicle, as described with reference to FIG. 1B. The desired direction R2' is along a longitudinal axis of the channel K, in particular along an axial symmetry axis as the longitudinal axis. The second direction R2 is fixed by the arms 21 and 23.

If the charging head 12 strikes the V-shaped interior of the channel of the guide device 118 during its movement and if it presses against a channel inner wall 119 in the second direction R2, a force may be produced in a third or fourth direction R3, R4 perpendicular to the desired direction R2' and parallel to the second surface 113. As a result, the plate P of the connection device 110 can be accordingly displaced along the rods 102 in the third or fourth direction R3, R4 until the charging head 12 enters the section K' with a constant width of the channel K. Displacement in the third or fourth direction R3, R4 then no longer takes place and the charging head 12 strikes the receiving head 112 precisely in a predetermined orientation. According to the invention, the charging head 12 is pressed against the underbody U of the vehicle, more precisely against the plate P of the connection device 110.

If the charging head 12 strikes the guide device 118 during its movement in the second direction R2 in such a manner that a non-vanishing angle exists between the second direction R2 and the desired direction R2', a torque—additionally or alternatively to the forces described in the preceding paragraph—can also be exerted on the plate P. As shown in the following FIGS. 4B and 4C, the plate is suspended from the rods 102 via a rotating joint 132, with the result that the torque can effect an advantageous orientation of the receiving head 112. For example, the desired direction R2' defined with respect to the receiving head 112 can be matched to the second direction R2. During a rotational movement of the plate P caused by the charging head 12, the springs 104 are accordingly stretched or compressed. In a position of rest, the springs 104 keep the channel K oriented in the direction of the desired direction R2' which is advantageously the forward direction of travel of the vehicle.

Figure 4B:
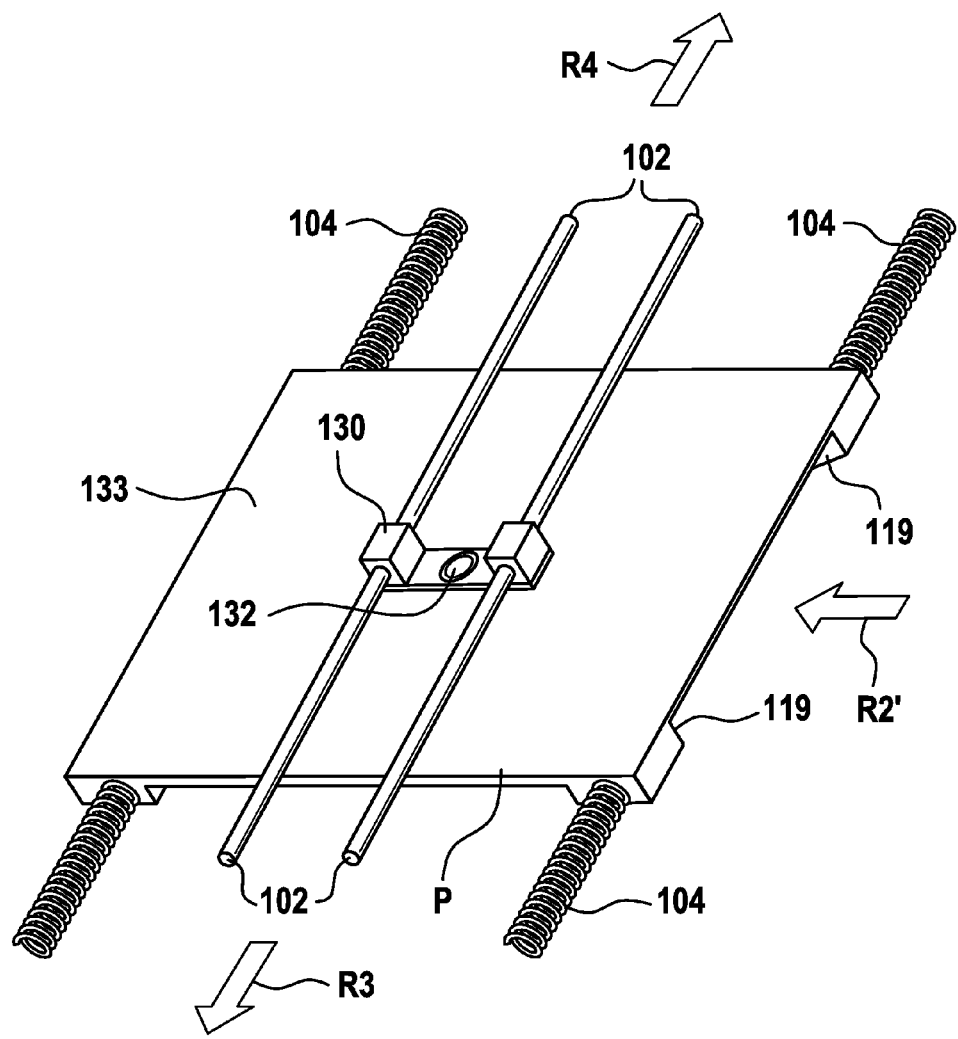
FIG. 4B shows a schematic plan view from above of the electric connection device of a vehicle for charging a battery of the vehicle according to the first embodiment of the second aspect of the present invention.

FIG. 4B shows a schematic plan view from above of the electric connection device 110 of a vehicle for charging a battery of the vehicle according to the first embodiment of the second aspect of the present invention.

As shown in FIG. 4B, the plate P is connected, on a rear side 133 of the plate P which faces away from the surface 113, to a yoke 130 via a rotating joint 132. The rotating joint 132 is advantageously arranged above a center of gravity of the plate P. The two rods 102 are guided through the yoke 130 in a manner parallel to one another and parallel to the plate P in such a manner that the yoke 130 which is permanently connected to the plate P can move along the rods 102. As a result, the plate P is displaceable along the rods 102, as described above. The plate P is also rotatable, by means of the rotating joint 132, around an axis of rotation perpendicular to the second surface 113 and perpendicular to the rear side 133 of the plate P in order to facilitate entry of the charging head 12 into the section K' with the constant width.

FIG. 4C shows a schematic plan view from the front, in particular from the desired direction R2', of an electric connection device of a vehicle for charging a battery of the vehicle according to the first embodiment of the second aspect of the present invention.

FIG. 4C depicts five guide slots 116, in each of which two of the second electric contacts 114 are formed.

Figure 5A:
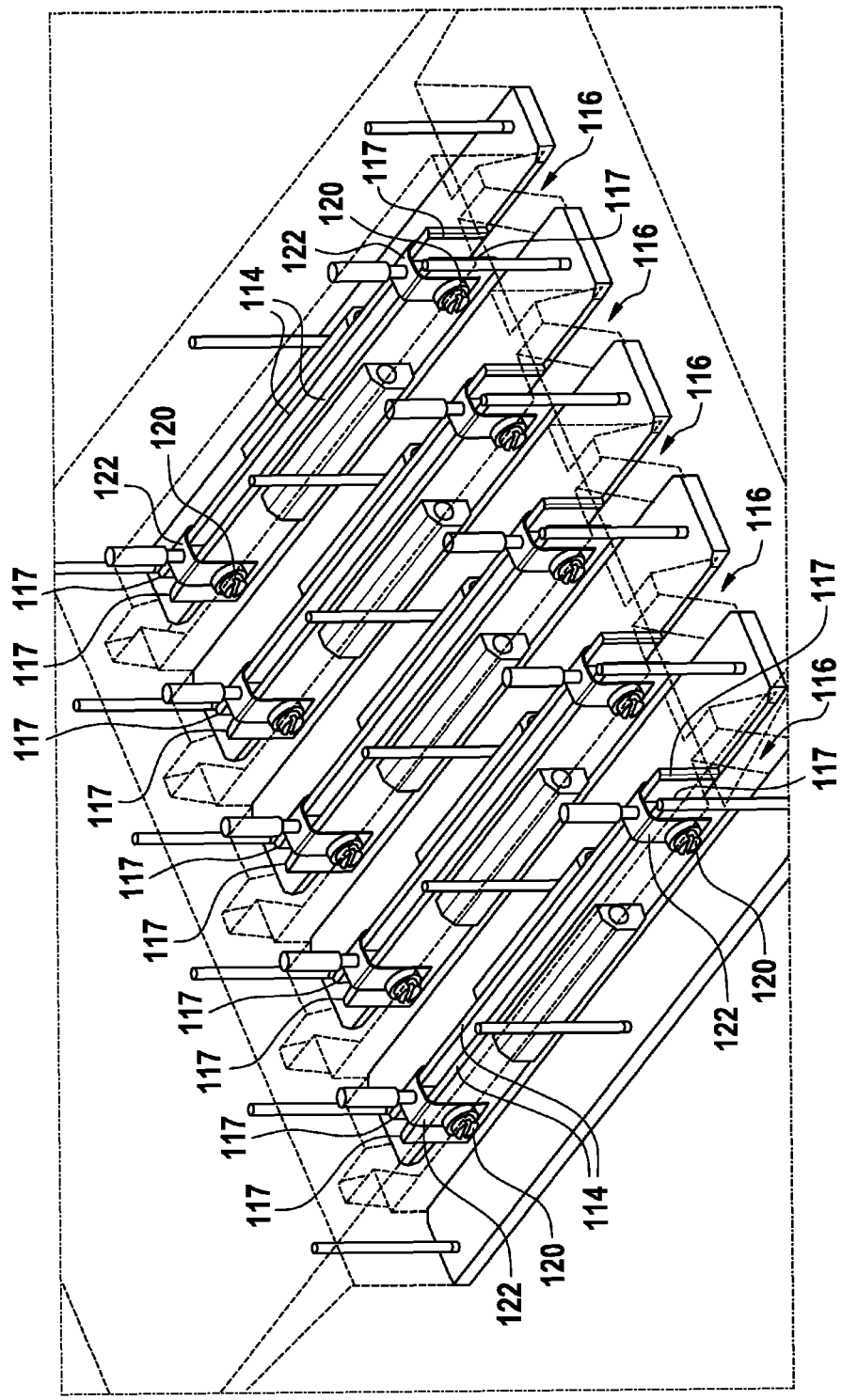
FIG. 5A shows a schematic detailed view from above of the receiving head of the connection device according to the first embodiment of the second aspect of the present invention.

FIG. 5A shows a schematic detailed view from above, that is to say from the direction of the vehicle, of the receiving head 112 of the connection device 110 according to the first embodiment of the second aspect of the present invention.

According to FIG. 5A, the ten second electric contacts 114 are formed parallel to one another and at a distance from one another and perpendicular to the second surface 113. The second contacts 114 are each in the form of electrically conductive strips inside the five guide slots 116. The two second contacts 114 arranged inside the same guide slot 116 are each connected to one another via two bracket-shaped leaf springs 122, one leaf spring 122 at each of the two longitudinal ends of the two strips. The ten leaf springs 122 each exert a spring force which presses each strip in the direction of the strip opposite it inside the same guide slot. Particularly good contact-connection is therefore possible if a first contact 14 is respectively inserted between the two strips.

The strips have beveled edges 117 toward the interior of the respective guide slot 116 in the longitudinal direction of the second electric contacts 114, that is to say in particular in a direction along the channel K of the connection device 110, with the result that the first electric contacts 14 can enter even more easily between the two second contacts 114 in the guide slot 116.

The five guide slots 116, the ten leaf springs 122, the twenty screws 120 and the ten second electric contacts 114 all have the same design according to the present embodiment. For the sake of clarity, only a selection of the elements has therefore respectively been provided with reference symbols in FIG. 5A.

As discussed with reference to FIG. 3, the first electric contacts 14 can perform a multiplicity of functions. In a manner corresponding to the configuration of the charging head 12, one or more of the second contacts 114 may be in the form of a protective line, a phase line, a high-voltage line, a low-voltage line etc. for the purpose of transmitting data and/or control signals.

The second electric contacts 114 may also be in the form of strips of the same length in each case inside the guide slots 116. However, some or all of the second electric contacts may also have different lengths. Some or all of the second electric contacts may also be arranged in a manner offset from one another with respect to a direction along the guide slots 116. As a result, if the first electric contacts 14 all have an identical design, for instance, different contacts are produced in a temporally offset manner, for instance in a similar manner to that described with reference to FIG. 3.

At least one of the second electric contacts 114 is directly or indirectly connected to the battery for the purpose of charging the battery of the vehicle. A charging device may be formed as part of the connection device 110 of the vehicle and can be controlled by means of the first control device of the charging device 10 and/or by means of the second control device of the connection device 110 via a predetermined one of the second electric contacts 114 in the case of contact with a predetermined one of the first electric contacts 14. The charging of the battery can be controlled by means of the charging device via two further predetermined second electric contacts 114, for example.

Figure 5B:
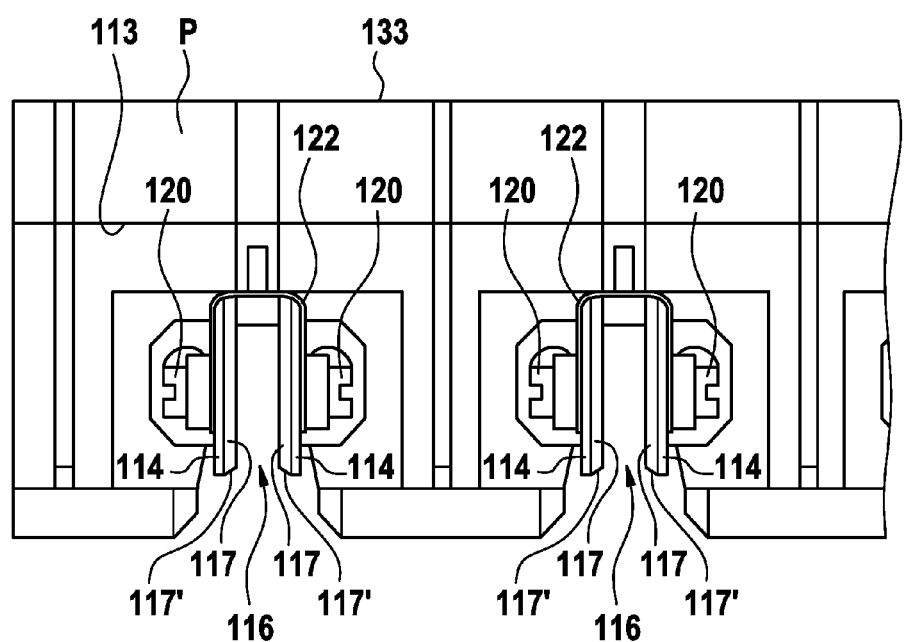
FIG. 5B shows a schematic detailed view from the front of the receiving head of the connection device according to the first embodiment of the second aspect of the present invention.

FIG. 5B shows a schematic detailed view from the front of [[a]] the receiving head of the connection device according to the first embodiment of the second aspect of the present invention. It is clear from FIG. 5B that edges of the second contacts 114 which are parallel to the plate P and point away from the plate P also have bevels 117' pointing in the direction of the interior of a respective guide slot 116, with the result that the first electric contacts 14 can enter even more easily between the two second contacts 114 in the guide slot 116.

FIG. 6 shows a schematic flowchart of a method according to the invention according to a third aspect of the present invention. For details and advantageous developments of the described method, reference is made to the preceding and subsequent figures and to the associated descriptions of the charging and connection devices according to the invention.

In a first method step S01, the lifting device 11 is actuated by means of the actuator 16 in such a manner that the charging head 12 connected to the lifting device 11 is at least partially moved in the first direction R1 and also in such a manner that, if the charging head strikes a stop surface in the first direction, the charging head 12 moves in the second direction R2.

In a second method step S02, the charging head 12 moving along the stop surface U, P is guided, by means of the guide device 118, into the predetermined charging position with respect to the receiving head 112 having the second electric contacts 114.

In a third method step S03, the battery of the vehicle F is charged from the energy source via the first and second electric contacts 14, 114.

FIG. 7 shows a charging head 12' of an electric charging device for charging a battery of the vehicle according to a second embodiment of the first aspect of the present invention.

The charging head 12' according to the second embodiment is a variant of the charging head 12 according to the first embodiment, three first electric contacts 14-1, 14-2, 14-3, or 14-i for short, being formed on the first surface 13. A conductive torus is formed on the first surface 13 for this purpose and is divided, by means of two electrically insulating insulation blocks 51, 52, into two regions which are electrically separate from one another and each of which constitutes an individual first contact 14-1, 14-2. A further first contact 14-3 is in the form of an arc between the insulation blocks 51, 52 and is electrically contact-connected via connections inside the insulation blocks 51, 52.

Figure 8:
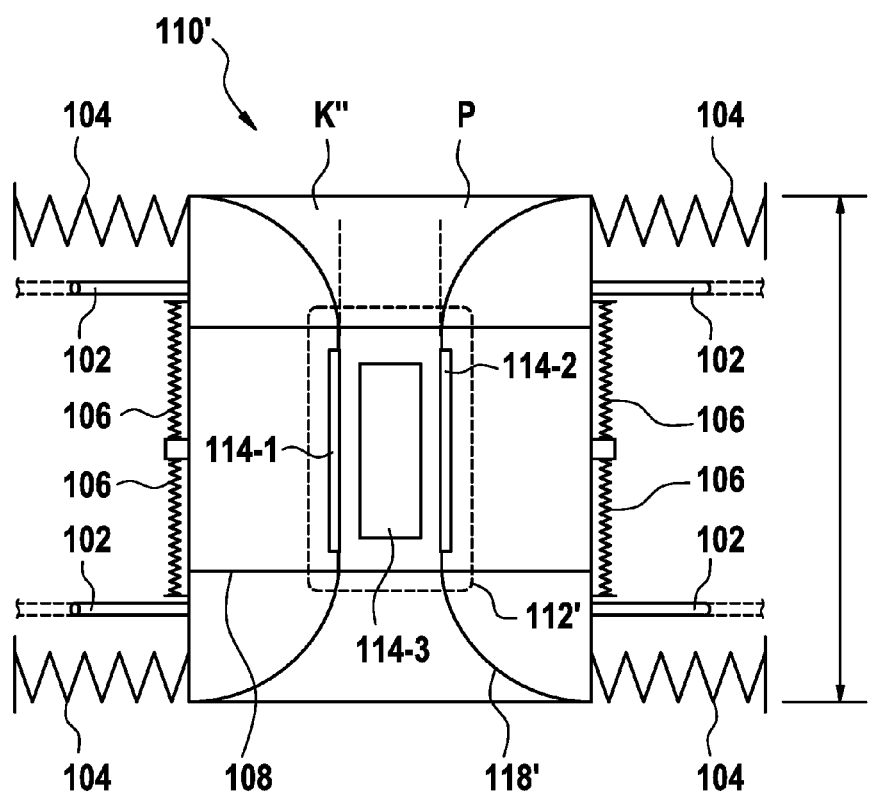
FIG. 8 shows an electric connection device of a vehicle for charging a battery of the vehicle according to a second embodiment of the second aspect of the present invention.

FIG. 8 shows an electric connection device 110' of a vehicle for charging a battery of the vehicle according to a second embodiment of the second aspect of the present invention.

The electric connection device 110' is designed to receive the charging head 12' according to the second embodiment of the first aspect of the present invention and is substantially a variant of the connection device 110. The connection device 110' has a guide device 118', the channel K" of which, in contrast to the channel K of the guide device 118, does not taper in a v-shaped manner on both sides, but rather tapers on both sides in a trumpet-shaped manner to the receiving head 112' of the connection device 110'. The receiving head 112' has three second electric contacts 114-1, 114-2, 114-3, or 114-i for short. Two of the second contacts 114-1, 114-2 are formed on inner walls of the channel K" and one of the second contacts is formed directly on the plate P of the connection device 110' in the center of the channel K" between the second contacts 114-1, 114-2. The contacts 114-1, 114-2, 114-3 are protected by a cover 108 which is displaceably suspended from four springs 106.

The connection device 110' according to the second embodiment of the second aspect and the charging device 10' according to the second embodiment of the second aspect of the present invention may together constitute a second embodiment of the charging system according to the invention.

In this case, the second contact 114-1 contact-connects the first contact 14-1, the second contact 114-2 contact-connects the first contact 14-2 and the second contact 114-3 contact-connects the first contact 14-3 in the predetermined charging position. For this purpose, the torus of the charging head 12' is completely inserted into the channel K" of the guide device 118'. In this case, the cover 106 is automatically pushed back.

Although the present invention was described above using preferred exemplary embodiments, it is not restricted thereto, but rather can be modified in various ways. In particular, the invention can be changed or modified in various ways without departing from the essence of the invention.

For example, instead of the first and second torsion springs 31, 32, it is also possible to use other springs, for instance spiral springs having longitudinal axes perpendicular to the axes of rotation of the first and second rotating joints 41, 42.

The guide may also be in the form of a smooth, lubricated outer surface and the slide may be designed with a smooth inside. In this case, the actuator may be a linear actuator, for example a pneumatic actuator or a magnetic actuator. The guide of the charging device may also have a further spring, as a result of which a counterforce acts on the slide when it approaches the first bearing block.

The charging head of the charging device may be protected by a cover which is suspended from the charging head 12; 12' with springs. The cover may be designed and the springs may be selected in such a manner that, when the charging head is pressed against the guide device of the connection device, for instance, the cover is automatically pushed back in order to release the first electric contacts 14; 14-i. The connection device 110; 110' can also be protected by a cover which is suspended from springs and, when the charging head 12; 12' is pressed against the cover, is automatically pushed back in order to release the second electric contacts 114; 114-i.

Insides of the covers on the charging head 12; 12' and on the receiving head 112; 112' may be formed in such a manner that the contacts 14, 114; 14-i, 114-i are covered in a form-fitting manner. This makes it possible to prevent small foreign objects from being deposited on the contacts 14, 114; 14-i, 114-i, for example cigarette butts. The form-fitting coverage can be achieved by means of a cover which is formed like a negative of the respective contacts 14, 114; 14-i, 114-i. That is to say, the first contacts 14; 14-i are covered with a form which is like the second contacts 114; 114-i and vice versa.

The charging device may also itself be arranged in a cavity or a housing which is closed, toward the top, by a trapdoor or sliding door, for example in order to protect the charging device from rain. It is possible to provide a coarse sensor system which determines whether a vehicle to be charged is in the predetermined area around the charging device. If this is the case, the trapdoor or sliding door is automatically opened and the actuator of the charging device is then actuated.

What is claimed is:
1. An electric charging device (10) for charging a battery of a vehicle, the charging device comprising:
 a lifting device (11), to which a charging head (12; 12') is coupled;
 the charging head (12; 12') having a first plurality of first electric contacts (14; 14-1, 14-2, 14-3) at or on a first surface (13) of the charging head (12; 12'), wherein the first plurality of first electric contacts are in the form of lamellae which are parallel to one another and are perpendicular to the first surface, wherein at least some of first electric contacts are configured to be connected to an energy source for the purpose of charging the battery; and
 an actuator (16) which is configured to actuate the lifting device (11) in such a manner that the charging head (12; 12') can be moved at least partially in a first direction (R1) which is substantially perpendicular to the first surface (13);
 the lifting device (11) also being configured such that, upon striking a stop surface (U, P) in the first direction (R1), the charging head (12; 12') can be moved in a second direction (R2) along the stop surface (U, P) by continued actuation of the lifting device (11) by the actuator (16).

2. The electric charging device (10) as claimed in claim 1, at least one of the lamellae having a different length in comparison with remaining lamellae.

3. The electric charging device (10) as claimed in claim 1, the charging head (12) being coupled to the lifting device (11) via a first arm (21); a first end of the first arm (21) being coupled to the charging head (12) via a first spring (31); and a second end of the first arm being coupled to the lifting device (11) via a second spring (32).

4. The electric charging device (10) as claimed in claim 1, the actuator (16) and the lifting device (11) being formed in such a manner that the lifting device (11) can be actuated by the actuator (16) causing a linear movement (LB) of a slide (20) of the lifting device (11).

5. An electric connection device (110; 110') of a vehicle for charging a battery of the vehicle, the connection device comprising:
 a receiving head (112; 112') which has a second plurality of second electric contacts (114; 114-1, 114-2, 114-3) at or on a second surface (113) of the connection device (110; 1101 wherein the second plurality of second electric contacts are formed parallel to one another and are perpendicular to the second surface;
 a guide device (118; 118') for receiving a charging head (12; 12') which is placed against the connection device (110; 110') and which moves substantially parallel to the second surface (113) and for guiding the moving charging head (12; 12') and the receiving head (112; 112') into a predetermined positional relationship with respect to one another;
 wherein, if the charging head (12; 12') and the receiving head (112; 112') are substantially in the predetermined positional relationship with respect to one another, the battery of the vehicle can be charged via the second electric contacts (114; 114-1, 114-2, 114-3).

6. The connection device (110) as claimed in claim 5, the second electric contacts (114; 114-1, 114-2, 114-3) being arranged at a distance from one another in a direction parallel to the second surface (113).

7. The connection device (110) as claimed in claim 5, the receiving head (112; 112') being movable with respect to the vehicle and being connected to the vehicle via at least one spring (104); and the at least one spring (104) exerting a restoring force in the event of deflections of the receiving head (112; 112') from a position of rest.

8. A charging system for charging a battery of a vehicle, having:
 an electric charging device (10) installed outside the vehicle; the charging device comprising:
  a lifting device (11), to which a charging head (12; 12') is coupled;
  the charging head (12; 12') having a first plurality of first electric contacts (14; 14-1, 14-2, 14-3) at or on a first surface (13) of the charging head (12; 12'), wherein the first plurality of first electric contacts are in the form of lamellae which are parallel to one another and are perpendicular to the first surface, wherein at least some of first electric contacts are configured to be connected to an energy source for the purpose of charging the battery; and
  an actuator (16) which is configured to actuate the lifting device (11) in such a manner that the charging head (12; 12') can be moved at least partially in a first direction (R1) which is substantially perpendicular to the first surface (13);
  the lifting device (11) also being configured such that, upon striking a stop surface (U, P) in the first direction (R1), the charging head (12; 12') can be moved in a second direction (R2) along the stop surface (U, P) by continued actuation of the lifting device (11) by the actuator (16); and
 an electric connection device (110; 110') formed on the vehicle, the connection device comprising:
  a receiving head (112; 112') which has a second plurality of second electric contacts (114; 114-1, 114-2, 114-3) at or on a second surface (113) of the connection device (110; 110');
  a guide device (118; 118') for receiving a charging head (12; 12') which is placed against the connection device (110; 110') and which moves substantially parallel to the second surface (113) and for guiding the moving charging head (12; 12') and the receiving head (112; 112') into a predetermined positional relationship with respect to one another;
  wherein, if the charging head (12; 12') and the receiving head (112; 112') are substantially in the predetermined positional relationship with respect to one another, the battery of the vehicle can be charged via the second electric contacts (114; 114-1, 114-2, 114-3);
 the charging head (12; 12') of the charging device (10) being configured such that the charging head can be inserted into the guide device (118; 118') of the connection device (110; 110'), and the first electric contacts (14; 14-1, 14-2, 14-3) being configured to be at least partially placed against the second electric contacts (114; 114-1, 114-2, 114-3) for the purpose of charging the battery.

9. A method for charging a battery of a vehicle, the method comprising:
 actuating a lifting device (11) by means of an actuator (16) in such a manner that a charging head (12; 12') connected to the lifting device (11) moves at least partially in a first direction (R1) which is substantially perpendicular to a first surface (13) of the charging head (12; 12'), a first plurality of first electric contacts (14; 14-1, 14-2, 14-3) being formed at the first surface (13), which contacts are at least partially connected to an energy source, wherein the first plurality of first electric contacts are in the form of lamellae which are parallel to one another and are perpendicular to the first surface, and in such a manner that, if the charging head (12; 12') strikes a stop surface (U, P) in the first direction (R1), the charging head (12; 12') moves in a second direction (R2) along the stop surface (U, P);

guiding the charging head (12; 12') moving along the stop surface (U, P) into a predefined charging position with respect to a receiving head (112; 112') having second electric contacts (114; 114-1, 114-2, 114-3) by means of a guide device (118; 118'); and charging the battery of the vehicle from the energy source via the first and second electric contacts (14, 114; 14-1, 14-2, 14-3, 114-1, 114-2, 114-3).

10. The electric charging device (10) as claimed in claim 1, at least one of the lamellae being arranged in a manner offset from remaining lamellae in a direction (R2) along the lamellae.

11. The electric charging device (10) as claimed in claim 1, at least one of the lamellae having a different length in comparison with remaining lamellae, and at least one of the lamellae being arranged in a manner offset from remaining lamellae in a direction (R2) along the lamellae.

\* \* \* \* \*